Oct. 1, 1935.  H. N. HERRICK ET AL  2,015,851
PRESSURE AND TEMPERATURE RECORDER
Filed March 6, 1933   2 Sheets-Sheet 1

Inventors
Henry N. Herrick
Walter G. Miller
By: *Attorney*

Oct. 1, 1935.   H. N. HERRICK ET AL   2,015,851
PRESSURE AND TEMPERATURE RECORDER
Filed March 6, 1933    2 Sheets-Sheet 2

Inventors
Henry N. Herrick
Walter G. Miller
By: J. H. Adams
Attorney

Patented Oct. 1, 1935

2,015,851

UNITED STATES PATENT OFFICE 2,015,851

PRESSURE AND TEMPERATURE RECORDER

Henry N. Herrick, Berkeley, and Walter G. Miller, Albany, Calif., assignors to Standard Oil Company of California, San Francisco, Calif., a corporation of Delaware Application March 6, 1933, Serial No. 659,604

3 Claims. (Cl. 234—17)

This invention relates to an apparatus for recording the physical conditions such as pressures and temperatures existing in wells which may produce oil, gas or water. It is particularly directed to a portable device which may be lowered into a well casing or tubing and which will form a permanent record of pressures and temperatures existing at various depths in the well.

The example of this invention which will be described below is adapted to record pressures and/or temperatures, and utilizes a pressure responsive mechanism of the spring-restrained piston type, although any other type of pressure responsive means known in the art could obviously be substituted therefor.

In the drilling and particularly in the operation of wells for the production of oil, gas and water, it is desirable and often essential to be able to accurately determine the physical conditions, such as pressure and temperature conditions existing at various points in the well. Data on depth pressures are of utmost value in determining allotments between wells in a given unit producing area, and serve to give a definite and tangible basis for allowable and equable production. By use of this device, data can readily and cheaply be obtained on such pressures and also on temperatures, which may serve to identify and coordinate data on producing formations, water zones and the like, as well as assist in cementing operations, proportioning tubing strings, gas lift equipment, etc.

In modern deep well practice, where well depths may be of the order of 10,000 feet and more, it has been found that the temperature of the well may increase from say 60° F. at the surface to 150–180° F. at the bottom of the well. This increase is usually uniform, and, under certain conditions, may form the basis for the motive power which operates the recording drum or similar mechanism of this device. At the same time, the technique of operation outlined permits a continuous record of temperature to be made as the device is lowered into the well bore, casing or tubing. In the example given, a bimetallic thermally responsive element or thermal motor is used to rotate the recording drum, as well as to give the temperature record desired, but it is obvious that any other form of thermal motor means could be substituted.

Under ordinary conditions, and particularly where pressures are to be measured in a flowing well, where the temperature of the oil may be uniform throughout, the differential between the temperature of the device when it is inserted in the well, and the final temperature which it attains after a certain time interval may form the basis for actuating the temperature responsive element. The time interval may be controlled, if desired, by suitably insulating the device as by external wrappings of well-known materials, or by the use of materials having various rates of heat conductivity for the casing of the thermal motor.

It is an object of this invention to disclose and provide an improved device for recording physical conditions, such as pressures, temperatures, or a combination of the two, at any point in a well bore of great depth.

Another object is to provide a rugged and accurate device for recording pressure and/or temperature in a well, which device may be of small diameter in order that it may be lowered through a flow string or tubing of any customary size.

Another object is to provide a thermally responsive means for actuating the recording means of any physical condition recorder which may undergo a change in temperature during any part of its operating cycle.

Another object is to provide a recording mechanism device of this type which is adapted to be easily and cheaply fabricated, and which has a minimum of small moving parts which would be damaged by handling, vibration or impact stresses.

These and other objects and advantages will be more fully apparent from the description which follows, and from the accompanying drawings, which form a part of this specification and illustrate a preferred embodiment of this invention.

Figure 1:
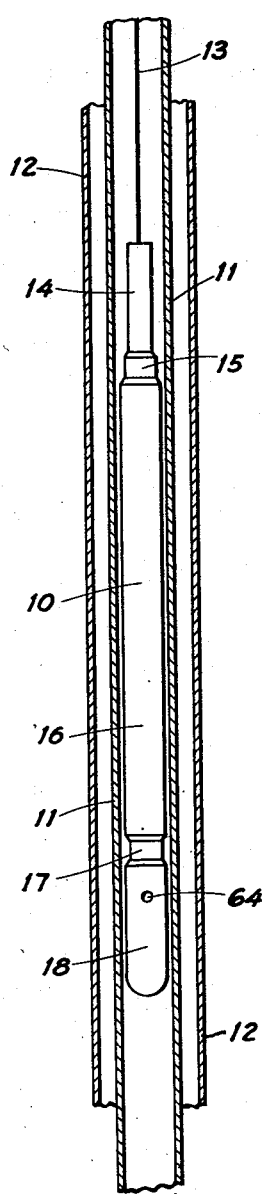
Figure 1 is a general side elevation of the device being lowered into a string of tubing in a well.

Referring to the drawings, Figure 1 illustrates a complete device generally designated 10 in the process of being lowered into a small diameter tubing 11 which is in place inside the casing 12 of a well. The recorder 10 is suspended from a steel wire or cable 13 which is attached to a rope socket 14 screwed onto the upper end of threaded plug 15 of the assembly. The recording and pressure responsive means are housed in the tubular steel casing 16, which is screwed at its upper end to supporting plug 15, and is screwed at its lower end onto connecting plug 17. A protector and liquid seal cup 18 extends downwardly from plug 17 and receives the outer end of the piston which, with the spring, comprises the pressure responsive means of this instrument. This construction involves but three threaded joints which must be made tight, as by copper or soft metal gaskets or sealing faces 19. Inasmuch as pressures of 5000 lbs. per square inch may be encountered, the advantages of such construction are evident.

Figure 2:
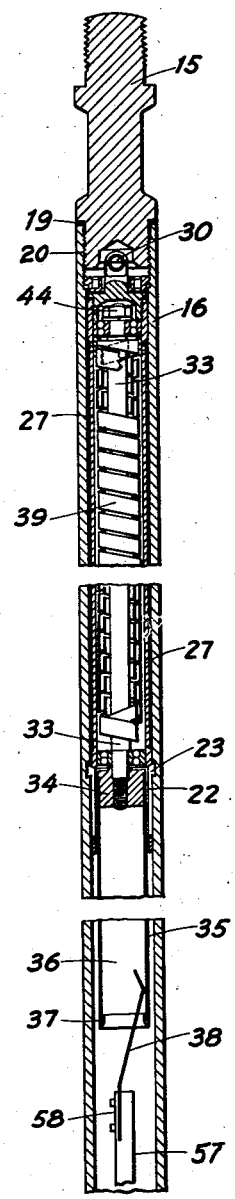
Figure 2 is a longitudinal section through the upper or recording section of the device shown in Figure 1.
Figure 4:
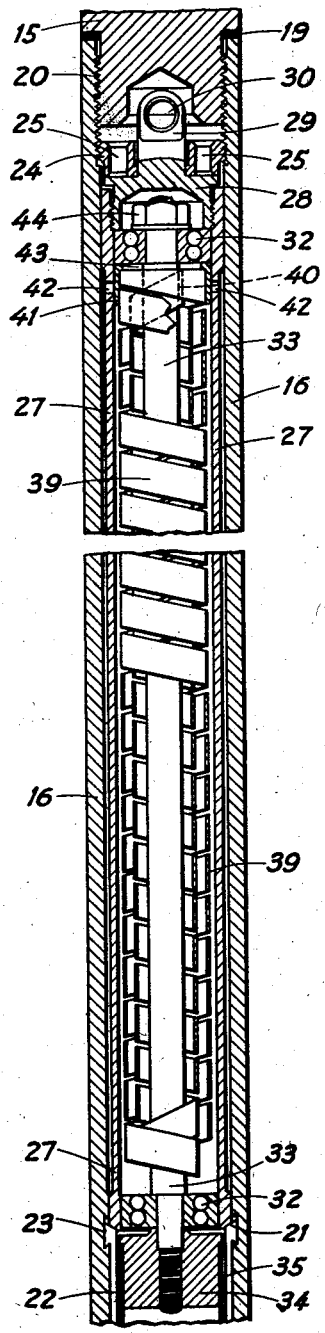
Figure 4 is an enlarged detail, partly in section, of a portion of the double bimetallic helix which comprises the thermal motor of the example illustrated.
Figure 5:
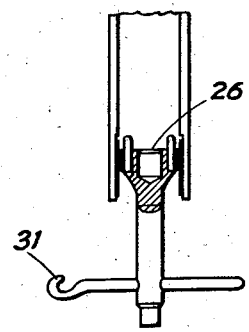
Figure 5 is a detail of a spanner wrench adapted to assemble and disassemble the recording mechanism.

Referring now to Figures 2 and 4, which show the details of the recording section of the instrument, the upper plug 15 is threaded into the steel casing 16 as at 20. A sealing ring 19, which may be of soft copper, or which may be built up on plug 15 with a weld-deposited soft metal alloy and machined to a true surface, makes this joint water and gas tight. A short distance inside the casing an abutment 21 is formed, as by a slotted ferrule 22 which is sprung into an annular recess 23 in the bore of casing 16. The recording mechanism assembly, which will next be described, is adapted to seat on abutment 21, and is held thereagainst by a threaded annular retainer plug 24, adapted to screw into threads 20 and provided with holes 25 for a spanner wrench 26 (Figure 5). Space is left between the inside end of plug 15 and the annular plug 24 to insure that plug 15 will seat on sealing ring 19 before it contacts plug 24.

The recording mechanism assembly is provided with a tubular outer casing or sleeve 27 which is adapted to closely fit inside the bore of the outer casing 16. The upper end of sleeve 27 is tightly closed by a threaded plug 28 which has an extension lug 29, adapted to project upwardly through the central opening of annular plug 24. Lug 29 is provided with a transverse hole 30 so that the hooked handle 31 of spanner wrench 26 (Figure 5) may be inserted to install or remove plug 28. The lower end of sleeve 27 may be beveled, as shown, to seat firmly on abutment 21 of ferrule 22.

Self-aligning radial ball bearings 32 are mounted in each end of sleeve 27 and support a shaft 33. The lower end of shaft 33 is threaded into a bushing 34 which, in turn, supports a tubular drum 35, inside of which is mounted a record chart 36. Chart 36 may be the usual sensitized chemical marking paper and is rolled up and sprung inside the drum 35 or may be positively retained therein by any suitable means (not shown). The lower or free end of drum 35 may be fitted with a guide bushing 37 to insure easy insertion and withdrawal of the stylus or marker 38, which may be of any desired form or material.

The double bimetallic helix 39, which forms the thermally responsive motor in the embodiment shown, is illustrated in Figures 2 and 4, and particularly the latter. The material of the helix is the usual bimetal, such as brass and Invar. The material known as "Wilco" Standard Thermo-Metal, which is of this type, has been found to be satisfactory. A strip $\frac{3}{32}$ inch thick and $\frac{3}{8}$ inch wide, with the brass side toward the center; the inside coil being $1\frac{1}{2}$ inch inside diameter and $\frac{7}{8}$ inch left hand pitch; and the outside coil being $1\frac{11}{16}$ inch inside diameter and $\frac{7}{8}$ inch right hand pitch, has been found to be quite satisfactory. Such a double helix 8⅝ inches long, which was annealed for 1 hour at 350 to 375° F. after forming, gave a drum rotation of 250 angular degrees for a 100° F. temperature change and 340 angular degrees for 136° F. temperature change.

The inner winding of the double helix 39 is brazed to shaft 33 at its upper end as shown at 40. The upper end of the outer winding of 39 is brazed to a thimble 41, which is a press fit in sleeve 27, and is soft soldered thereto through the radial holes 42 (Figure 4), after the helix 39 is assembled on the shaft 33 and is inserted into sleeve 27. The lower ends of both windings of the double helix are brazed together as shown in order that their turning efforts may be cumulative.

The upper end of shaft 33 is retained in place in upper bearing 32, the inner race of which is clamped between a shoulder 43, and a threaded nut 44 on the shaft. It is obvious that plug 28 must be recessed as shown to allow the shaft 33 with nut 44 to rotate freely under the action of the bimetallic helix 39 of the thermal motor.

The construction just outlined permits the removal of the entire recording mechanism assembly from the upper part of casing 16, by first unscrewing plug 15; then, with spanner wrench 26, unscrewing retainer plug 24; after which, with spanner hook 31 engaged in the transverse hole 30, the plug 28, sleeve 27 and record drum 35 may be removed as a unit, for inspection, or insertion or removal of record chart 36.

Figure 3:
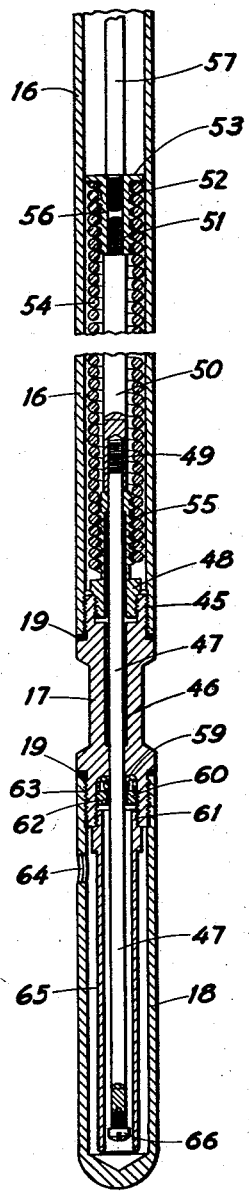
Figure 3 is a longitudinal section through the lower or pressure responsive section of the device shown in Figure 1.

Referring now to Figure 3, which illustrates the lower section of the instrument containing the pressure responsive mechanism, the lower end of casing 16 is screwed onto connecting plug 17 by threads 45. The joint is made tight by means of gasket or ring 19, previously described.

Plug 17 is bored as shown at 46 to receive an accurately finished piston 47 which extends upwardly through a guide bushing and spring retainer 48 into the lower end of the chamber formed by casing 16. The upper end of the piston 47 is threaded as at 49 and is screwed into a spacer or spring support rod 50. At its upper end rod 50 is threaded at 51 into a piston rod connecting and spring retaining bushing 52, the flange 53 of which is serrated and forms a guide bearing against the machined inner surface of casing 16.

A carefully designed and calibrated steel wire spring 54 is fixed at its lower end to the coarse threaded shank 55 of guide bushing and spring retainer 48. This spring is deflected by the well bore pressure acting upon piston 47 and such deflection is substantially proportional to that pressure. The design of such springs is so well known to the art that details are not pertinent to this discussion. The upper end of spring 54 is similarly affixed to the coarse threads 56 of spacer rod bushing 52, thereby urging the piston 47 downwardly, the downward motion being limited by the bottom of spacer rod 50 seating on the top of piston guide bushing 48.

A stylus rod 57 is screwed into the top of connecting bushing 52 and carries a spring stylus 38 in a clamp 58 at its upper end (Figure 2). Thus, any longitudinal motion of the piston 47, when the apparatus is assembled as shown, will cause stylus 38 to make a corresponding mark on the sensitized paper record chart or card 36, previously described, and illustrated in Figure 2.

Piston 47 extends downwardly through bore 46 in connecting plug 17 and is packed off with cup leather 59, which is held in place by a retainer 75 plug 60 screwed into threads 61. This may have a square hole 62 therethrough so that it may be installed and removed with a square plug wrench, while piston 47 is withdrawn from plug 17.

A protector and liquid seal cup 18 is threaded onto plug 17 at 63 and is provided with a tapped hole 64 near its upper end. A gasket or sealing ring 19 is installed at the juncture to facilitate testing and calibration of the instrument, although no pressure differential exists across this joint under normal conditions of service.

Inside of cup 18, and surrounding the lower end of piston 47 is a sleeve 65, which is threaded at its upper end to screw into the threaded recess 61 of plug 17. This construction provides a trapped space which may be filled with a sealing fluid, such as a lubricating oil, to serve as a protection to the piston 47 and cup leather 59 from sand, oil, mud, and water which may enter the cup 18 through hole 64 when the recorder is lowered into a well.

A stop screw 66 is provided at the lower end of piston 47 to limit its upward motion against the compression of spring 54 by seating against retaining plug 60.

It will be noted that all of the pressure responsive mechanism is associated with plug 17, so that when the plug is unscrewed from casing 16, all of this mechanism is accessible. It has been found desirable to make these pressure responsive assemblies for a definite pressure range, for example 0–250, 0–750, 0–1750, 0–3000 and 0–5000 pounds per square inch. This is readily accomplished by providing springs of proper strength in relation to the diameter of the piston. A total movement of about 5 inches has been found to be quite practical, and good accuracy has been obtained in service.

In calibrating the pressure element of the instrument, it is assembled in a vertical position and the trap chamber in cup 18 is filled with a light oil. Hydraulic pressure connections are made to the tapped hole 64 and a conventional dead weight pressure gauge tester is used in the usual manner and with various loadings to obtain the spring deflection as indicated by the longitudinal marks of the stylus record on card 36.

Calibrating the temperature responsive and thermal motor element may be carried out by immersing the whole device in a heated water bath, by comparing with a standard thermometer and noting the angular deflection of the drum from its position at the base temperature by the transverse markings of the stylus record. Time must obviously be allowed for the helix 39 to come up to the temperature of the casing and calibrating bath. This time lag should be noted, for it is of value in interpreting records, as will be explained below.

Figure 6:
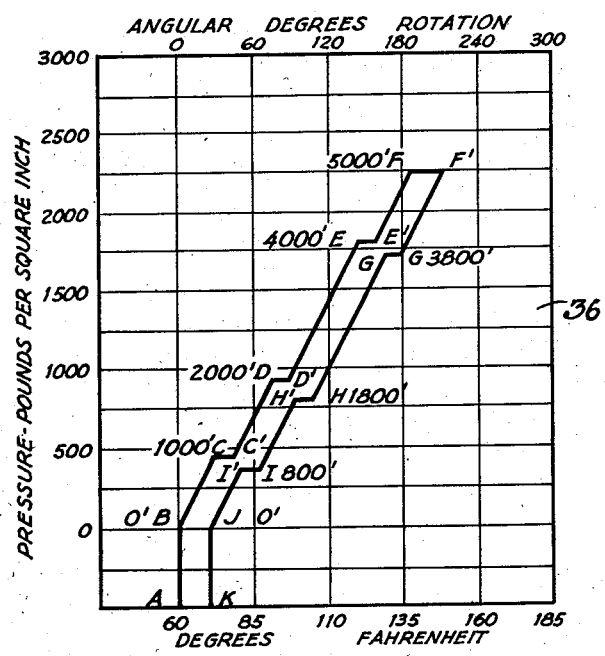
Figure 6 is a representation of a typical chart obtained from the pressure-temperature recorder illustrated, showing the interrelation between pressures, temperatures and depths.

Referring to Figure 6, which shows a typical chart as obtained from the use of this instrument, the horizontal rulings represent pressure units as determined by the pressure calibration outlined above. The vertical rulings represent both angular degrees of rotation of the recording drum (upper scale) and corresponding temperature change in degrees Fahrenheit as determined by the calibration of the thermal motor in the water bath just described. Correlation of these scales depends upon the design of the thermal motor, and that illustrated gave an angular rotation of 300 degrees for a temperature change of 125 degrees Fahrenheit, or from 60 to 185 degrees as shown.

The operation which gave the typical chart shown in Figure 6 will illustrate one method of using this device and interpreting the record therefrom. The instrument was initially at an ambient temperature of 60° F., and the stylus 38 entered the chart 36 at A and moved vertically to B, which represents zero or atmospheric pressure on the pressure scale. The instrument was then lowered 1000 feet, according to its measured supporting line or cable, to C, and the increase in ambient temperature during that travel caused the thermal motor to rotate the drum 35 and chart 36, so that the line BC is sloped as shown. The instrument then remained a short time at the 1000 foot level, as indicated by the horizontal trace from C to C', which represents further rotation of the thermal motor as temperature equilibrium between the motor and the fluid in the well was completed. The time for substantially complete equilibrium to be attained had previously been determined in the calibration process mentioned, and the instrument was allowed to remain at a given level long enough to come to its proper temperature indication, as at C'.

The device was then lowered to the 2000 foot level or from C' to D, where the same procedure was followed. The horizontal line D—D' represents the pressure at that level, and the point D' gives the temperature at that location. The procedure was repeated at E and F, as shown by the chart of Figure 6.

In coming out of the hole, the points G, H, and I were chosen not to coincide with the points E', D' and C', respectively, in order that the pressure-temperature records would not become confused. Obviously, in coming out, the curve F"—J would move backwardly along the chart, as the temperatures and pressures respectively decreased in value.

If it is desired to increase the angular deflections of the thermal motor beyond that which will be caused by normal temperatures in the well bore, the instrument may easily be preheated or precooled before it is placed in the hole. For example, if the temperature of the oil from a flowing well were uniformly 80° F., from the top to the bottom of the well, the instrument may be heated to say 200° F. and then allowed to cool as it was being lowered, the time lag in the response of the motor to the oil temperature furnishing the time lag for the marking of the pressure records. Such a procedure would obviously not give an indication as to true oil temperatures at various points in the well, nor would it give a curve such as that of Figure 6, but its interpretation would be obvious. In case of precooling, a bath of ice and salt, or solid carbon dioxide could be used to give an initial temperature which would be sufficiently different from the well temperature to result in the desired maximum angular deflection of the thermal motor, and a continuous pressure record during all or any part of the operating cycle of the device.

In conclusion, it will be seen that a novel and useful recording mechanism actuating means has been provided, in which the difference in temperature, either natural or induced, between the extreme physical conditions of all or part of the operating cycle is utilized to operate the chart or record moving mechanism, as well as to provide and record an indication of temperature under proper conditions of use.

We claim:
1. A well pressure recorder comprising a cas- ing, a spring restrained piston in said casing exposed to external fluid pressure, a stylus carried by said piston, a chart adapted to record the longitudinal motion of said stylus, a rotatable holder for said chart, and a bimetallic helix secured at one end to said casing and secured at the other end to said rotatable holder for rotating said holder in response to a temperature change in said helix.

2. An apparatus in accordance with claim 1, wherein said piston, said chart holder, and said helix are in axial relation.

3. An apparatus in accordance with claim 1, wherein said piston and said helix are disposed within said casing and concentrically thereof.

HENRY N. HERRICK.
WALTER G. MILLER.